United States Patent Office 3,647,796
Patented Mar. 7, 1972

3,647,796
CYCLICAMINO ALKYLAMINOTHIOACRIDINE
Edward F. Elslager, Ann Arbor, Mich., assignor to Parke, Davis & Company, Detroit, Mich.
No Drawing. Filed Dec. 23, 1968, Ser. No. 786,435
Int. Cl. C07d 37/22
U.S. Cl. 260—279 R
6 Claims

ABSTRACT OF THE DISCLOSURE

Novel alkylaminothioacridines (I) are provided by condensing the corresponding acridinethione (II) with a haloalkylamine of formula X—A—$R_2$ or by condensing 9-chloro-3-(dimethylamino)acridine with a mercaptoalkylamine of formula HS—A—$R_2$ where $R_1$ is H or dimethylamino, $R_2$ is a cyclic nitrogen-containing group (morpholino; morpholinyl; 2-, 3- or 4-pyridyl or 4 to 6 carbon azacycloalkyl containing at least 4 carbon atoms joined annularly with nitrogen); A is a divalent hydrocarbon group containing up to 3 carbon atoms or a direct bond attaching $R_2$ in a manner providing at least a two-carbon separation between the $R_2$-nitrogen and the attaching bond; and X is a halogen atom. The acridine products are useful as antiparasitic and antibacterial agents, and as inhibitors of blood platelet aggregation.

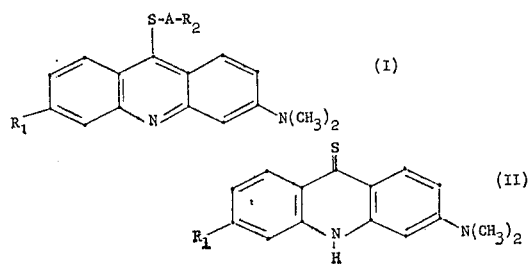

SUMMARY AND DETAILED DESCRIPTION

The present invention relates to novel alkylaminothioacridines having in free base form the formula

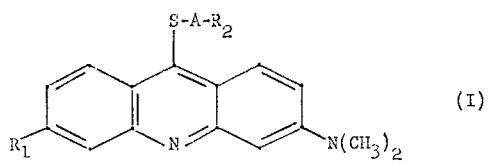

and acid addition salts thereof, to process means for the production thereof, to pharmaceutical compositions containing such compounds and means for administering the same; where $R_1$ is H or dimethylamino, $R_2$ is a cyclic nitrogen-containing group selected from the class consisting of morpholino; morpholinyl; 2-, 3- and 4-pyridyl, and 4 to 6 carbon azacycloalkyl containing at least 4 carbon atoms joined annularly with nitrogen; and A is a divalent hydrocarbon group containing up to 3 carbon atoms or a direct bond, A in either case attaching $R_2$ in a manner providing at least a two-carbon separation between the $R_2$-nitrogen and the attaching bond.

According to one embodiment of the invention compounds of Formula I are produced by condensing an alkylaminoacridinethione of Formula II

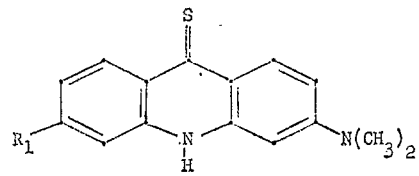

with a haloalkylamine of formula X—A—$R_2$ optionally in the presence of a base where A, $R_1$ and $R_2$ have the foregoing significance and X is a halogen atom. The reaction conditions are subject to considerable variation. In one embodiment the reaction is carried out by fusing the reactants without solvent. In another embodiment, the reaction is carried out in the presence of base in an inert medium, examples of which are lower alkanols, aromatic hydrocarbons, ethers, esters such as ethyl acetate, tertiary amides, dimethyl sulfoxide, and mixtures thereof. N,N-dimethylacetamide is a preferred medium. Any of various bases can be used such as an alkali metal alkoxide, hydroxide, carbonate or bicarbonate. Potassium carbonate is a preferred base. The base is ordinarily employed in sufficient quantity to neutralize the hydrogen halide formed during the reaction. The relative quantities of the reactants can be varied although the use of equimolar amounts of the reactants is preferred. The reaction can be carried out at temperatures ranging from about 35–175° C. According to a preferred procedure employing a solvent, the reaction is carried out at temperatures from about 65–85° C. under which conditions the reaction is complete in periods ranging from 2–4 hours. If desired, the progress of the reaction can be followed from time to time by subjecting samples of the reaction medium to thin layer chromatography. In a preferred procedure which omits the solvent, the reactants are heated together at temperatures from about 125–145° C. for about 5–20 minutes at which time the reaction is complete.

In another embodiment of the invention the products of Formula I where $R_1$ represents hydrogen are prepared by condensing 9-chloro-3-dimethylaminoacridine with a mercapto alkylamine HS—A—$R_2$ where A and $R_2$ have the same significance. The reaction conditions are subject to considerable variation. The reaction is ordinarily carried out in the presence of a solvent such as phenol, a lower alkanol, an aromatic hydrocarbon, ether, a tertiary amide or dimethyl sulfoxide. The condensation is conveniently carried out in the absence of added base although, if desired, an alkali metal alkoxide or hydroxide may be used to form the thio salt. When a lower alkanol is used as solvent, addition of base is preferred. In the absence of base, phenol is a preferred solvent. The ratio of reactants can be varied widely although an equivalent quantity of reactants is preferred. The time and temperature of the reaction can be varied and are not critical. The preferred reaction temperatures are in the range from about 75–125° C. under which conditions the condensation is ordinarily complete in about 3 to 7 hours. If desired, the progress of the reaction can be followed by subjecting samples of the reaction mixture from time to time to thin layer chromatography.

The free base alkylaminothioacridine compounds of the invention having Formula I form acid addition salts with any of a variety of inorganic and organic acids. The products of the reactions described above can be isolated as the free base or as the acid addition salt. Also, the products can be obtained as pharmaceutically acceptable acid addition salts by reacting one of the free base compounds with an acid such as hydrochloric, hydrobromic, hydriodic, nitric, sulfuric, phosphoric, acetic, citric, maleic, succinic and pamoic acids. The free base and salt forms are inter-convertible by adjustment of the pH. They differ in certain physical properties such as solubility in polar solvents but in general are otherwise equivalent for purposes of the invention.

The compounds of the invention in free base and acid addition salt form are pharmacologically useful as inhibitors of blood platelet aggregation and as antibacterial and antiparasitic agents. Their activity against blood platelet (thrombocyte) aggregation can be demonstrated and quantitatively measured in a standard in vivo test which measures the relative inhibition of adenosine diphosphate (ADP)-induced aggregation of rabbit blood thrombocytes (cf. J. Physiol., 168, 178). The details of the test are as follows: A measured intravenous dose of the test compound is administered to the rabbit, platelet rich plasma samples being taken from the rabbit before and 30 minutes after dosage. The samples are treated with one-tenth volume of 3.8% aqueous sodium citrate; adenosine diphosphate (1 µg./ml.) is then added to the platelet rich plasma, and the mixture is gently agitated. In the absence of an inhibiting substance the platelets characteristically become aggregated and correspondingly give rise to a decrease in optical opacity. The change of optical opacity is a quantitative measure of platelet aggregation. Results obtained for representative compounds of the present invention are shown in the following table, expressed as percentage inhibition caused by representative test compounds which are the subject of examples which follow:

PERCENT INHIBITION OF THROMBOCYTE AGGREGATION

| Example No. | Dose, mg./kg. | No. rabbits tested | Percent inhibition platelet aggregation |
| --- | --- | --- | --- |
| 1 | 12 | 2 | 100, 98 |
| 2 | 12 | 3 | 100, 100, 100 |
| 3 | 12 | 2 | 93, 100 |
|   | 6 | 1 | 100 |
| 4 | 12 | 3 | 100, 100, 60 |
| 6 | 12 | 9 | 100(6), 84(2), 77 |
| 7 | 12 | 2 | 100, 100 |

Preferred products for their superior activity as thrombocyte aggregation inhibitors for purposes of the invention are 3,6-bis(dimethylamino)-9-[(3-piperidinopropyl)thio]-acridine, 3,6-bis(dimethylamino)-9-[(2-piperidinoethyl)thio]-acridine, 3,6-bis(dimethylamino)-9-{[2-(1-methyl-2-pyrrolidinyl)-ethyl]thio}acridine, 3,6-bis(dimethylamino)-9-{[2-(1-pyrrolidinyl)ethyl]-thio}acridine, and pharmaceutically acceptable acid addition salts.

The products are also useful antibacterial agents. For example, by the gradient plate technique the minimum inhibitory concentration against *Pseudomonas aeruginosa* 28 is in the range from 15–20 gamma/ml. for products of the examples which follow. The products also are useful as antiparasitic agents. Specially, an antiomoebic agents in standard in vitro antiamoebic tests, the compounds exemplified are amoebastatic (i.e., 90% suppression of growth) at concentrations in the range from about 0.8–12.5 gamma/ml.

It will be appreciated that for clinical use the pharmacologically active compounds of the invention can be made up, in accordance with well-known pharmaceutical techniques, into compositions having as an essential active ingredient one or more of the alkylaminothioacridine compounds of Formula I above in free base or acid addition salt form. The compositions will generally contain in association with the active ingredient one or more pharmaceutical diluents and/or excipients of the kind normally used in the production of medicaments ready for use. If desired, the compositions can be made up in a dosage unit form suitable for the particular mode of administration, the quantity of active ingredients in each dosage unit being such that one or more units are required for each therapeutic administration. The dosage unit may exist, for example, in the form of a tablet, pill, sachet, packaged powder or encapsulated powder for oral administration or in the form of a sterile injectable solution or suspension contained in an ampoule for parenteral administration. The recommended human dosage of the compounds for thrombocyte aggregation inhibition is 0.5–3.0 mg./kg., intravenously, once daily for short term treatment up to one week; the oral dosage recommended is about 5–10 mg./kg. per day, for periods exceeding one week. As antibacterial agents the compounds can be used in topical product form; also the compounds can be formulated as liquid or aerosol preparations for sterilizing or disinfecting rooms and work areas.

The invention is illustrated by the following examples.

EXAMPLE 1

To a solution of 6.0 g. of 3,6-bis(dimethylamino)-9(10H)-acridinethione, 5.9 g. of potassium carbonate, and 100 ml. of N,N-dimethylacetamide, is added 40 g. of N-(3-chloropropyl)piperidine hydurochloride. After heating at 75° C. for 3 hours, the reaction mixture is cooled and poured into ice-water. The free base product, 3,6-bis-(dimethylamino)-9-[(3 - piperidinopropyl)thio]acridine, is collected by filtration, washed with water, and then treated with excess 0.5 N hydrochloric acid. The acid mixture is filtered and its filtrate alkalinized with excess sodium hydroxide. Ether extracts of the resulting mixture are washed with water, dried over anhydrous potassium carbonate, and then concentrated to a volume of about 100 ml. The free base separates in crystalline form and melts at 93–95° C. after washing with petroleum ether and drying in vacuo.

The product as the hydrochloride salt can be obtained by dissolving the free base in isopropanolic hydrogen chloride and isolating the solid product which separates. The corresponding hydrobromide salt is obtained by treating a solution of the free base with dry hydrogen bromide, and the sulfate salt by treating with sulfuric acid. A salt with citric acid is obtained by mixing methanolic solutions of the free base and citric acid and concentrating the mixture. The condensation procedure described in the preceding paragraph has general application for the preparation of other products starting with different acridinethiones or amines. For example, by the same procedure but starting with equivalent amounts of 3-(dimethylamino) - 9(10H) - acridinethione and N-(2-chloroethyl)-piperidine, the produce obtained is 3-(dimethylamino)-9[(2-piperidinoethyl)thio]acridine.

The acridinethione starting material (for purpose of illustration, the bis-substituted acridinethione described first above) can be prepared as follows: A mixture of 100 g. of 3,6-bis(dimethylamino)acridine and 12.2 g. of sulfur is placed in an oil bath at 200° C. The temperature is raised to 240–250° and maintained for 1 hour. Recrystallization, first from dimethylsulfoxide, then from N,N-dimethylformamide provides the product, 3,6 - bis(dimethylamino)-9(10H)acridinethione, M.P. >300° C.

EXAMPLE 2

Substituting 4.0 g. of N-(2-chloroethyl)hexamethyleneimine hydrochloride for 4.0 g. of N-(3-chloropropyl)piperidine hydrochloride in Example 1, the product obtained is 3,6-bis(dimethylamino)-9-{[2-(hexahydro-1H-azepin-1-yl)ethyl]thio}acridine, M.P. 128–130° C. after recrystallization from chloroform-heptane.

EXAMPLE 3

Substituting 3.8 g. of N-(2-chloroethyl)piperidine hydrochloride for 4.0 g. of N-(3-chloropropyl)piperidine hydrochloride in Example 1, the product obtained is 3,6-bis(dimethylamino) - 9 - [(2-piperidinoethyl)thio]acridine, M.P. 135–137° C. after recrystallization from ether.

EXAMPLE 4

2-(2 - chloroethyl( - 1 - methylpyrrolidine hydrochloride (1.5 mol.) and 3,6-bis(dimethylamino)-9(10) - acridinethione (1 mol.) are heated together at 135° C. for 10 minutes. The liquid reaction mixture which results from heating is cooled and worked up as in Example 1. The product obtained is 3,6 - bis(dimethylamino)-9-{[2-(1 - methyl-2-pyrrolidinyl)ethyl]thio}acridine, sesquihydrate, M.P. 70–72° C. after recrystallization first from acetone-water and then from ethyl acetate. To obtain the corresponding dihydrochloride monohydrate salt, a mixture of 436 mg. of the free base, 25 ml. of isopropanol, and 0.17 ml. of concentrated hydrochloric acid is stirred briefly and then concentrated. The residual product is the dihydrochloride monohydrate, M.P.>234° C. after recrystallization from acetonitrile-ether.

By substituting 2 - (2 - chloroethyl)-1-ethylpyrrolidine hydrochloride in the above procedure, the free base product obtained is 3,6-bis(dimethylamino)-9-{[2-(1-ethyl-2-pyrrolidinyl)ethyl]thio}acridine.

EXAMPLE 5

Substituting 3.8 g. of N-(2-chloroethyl)morpholine hydrochloride for 4.0 g. of N-(3-chloropropyl)piperidine hydrochloride in Example 1, the product obtained is 3,6-bis(dimethylamino) - 9 - [(2-morpholinoethyl)thio]acridine, M.P. 170–171° C. after recrystallization from acetonitrile.

By substituting 2 - (2 - chloroethyl)morpholine hydrochloride in the above procedure, the product obtained is 3,6-bis(dimethylamino) - 9 - {[2-(2-morpholinyl)ethyl]thio}acridine.

EXAMPLE 6

Substituting 3.4 g. of N-(2-chloroethyl)pyrrolidine hydrochloride for 4.0 g. of N-(3-chloropropyl)piperidine hydrochloride in Example 1, the product obtained is 3,6-bis(dimethylamino) - 9 - {[2-(1-pyrrolidinyl)ethyl]thio}acridine, M.P. 165–166° C. after recrystallization from acetonitrile.

For salt formation, a solution of 394 mg. of the free base, 25 ml. of isopropanol, 0.5 ml. of 25% hydrochloric acid-isopropanol is diluted with ether. The precipitating dihydrochloride monohydrate, D.P. 263° C. after recrystallization from isopropanol-ether, is collected by filtration.

By substituting 3-(2-chloroethyl) - 1 - ethylpyrrolidine in the foregoing procedure, the product obtained is 3,6-bis(dimethylamino) - 9 - {[2 - (1-ethyl-3-pyrrolidinyl)ethyl]thio}acridine.

EXAMPLE 7

Substituting 3.7 g. of 3-chloromethyl-1-methylpiperidine hydrochloride for 4.0 g. of N-(3-chloropropyl)piperidine hydrochloride, the product obtained is 3,6-bis(dimethylamino) - 9 - {[(1 - methyl-3-piperidyl)methyl]thio}acridine, sesquihydrate, M.P. 80–82° C. after recrystallization from ether-petroleum ether.

EXAMPLE 8

Substituting 3.4 g. of 4 - chloromethylpyridine hydrochloride for 4.0 g. of N-(3-chloropropyl)piperidine hydrochloride in Example 1, the product obtained is 3,6-bis(dimethylamino)-9-[(4 - pyridylmethyl)thio]acridine, M.P. 192–195° C. after recrystallization from acetonitrile.

EXAMPLE 9

Using a procedure analogous to that of Example 8 but starting instead with 3-chloromethylpyridine hydrochloride, the product obtained is 3,6-bis(dimethylamino)-9-[(3-pyridylmethyl)thio]acridine, M.P. 188–189° C.

EXAMPLE 10

Using a procedure analogous to that of Example 9 but starting instead with 2-chloromethylpyridine hydrochloride, the product obtained is 3,6-bis(dimethylamino)-9-[(2-pyridylmethyl)thio]acridine, M.P. 166–168° C.

EXAMPLE 11

A solution of 2.0 g. of 9-chloro-3-(dimethylamino)acridine, 1.0 g. 4-mercapto-1-methylpiperidine, and 20 ml. of phenol is heated three hours at 95° C., cooled, and then poured into 800 ml. of ether containing 5 ml. of 22% hydrochloric acid in isopropanol. After decantation of the supernatant liquid, the residue is dissolved in 0.5 N hydrochloric acid. The acid solution is washed with ether and then basified using excess sodium hydroxide. Chloroform extracts of the resulting mixture are dried over anhydrous potassium carbonate and concentrated. Recrystallization of the residue from acetonitrile yields the desired product, 3-(dimethylamino) - 9 - [(1 - methyl-4-piperidyl)thio]acridine, M.P. 182–183° C.

The acridine starting material can be prepared as follows:

(a) A mixture formed by cautious addition of 200 ml. of phosphorus oxychloride to 25 g. of N-(m-dimethylaminophenyl)-anthranilic acid is refluxed four hours, cooled, and then carefully added to a large volume of ice water. Chloroform extracts of the aqueous mixture are dried over anhydrous potassium carbonate, concentrated, and a benzene solution of its residue placed over a column of alumina. Concentration of ethyl acetate-benzene eluates provides the starting material, 9-chloro-3-(dimethylamino)acridine.

The compounds of the invention, as indicated previously, can be formulated in any of a variety of pharmaceutical compositions such as capsules, tablets, suspensions, solutions, etc. The following examples illustrate the preparation of such pharmaceutical compositions containing illustrative products as an active ingredient:

EXAMPLE 12

CAPSULES CONTAINING 250 MG.

| Amt./capsule | Ingredient | Amt./10,000 capsules |
|---|---|---|
| 250 mg | 3,6-bis(dimethylamino)-9-{[2-(1-pyrrolidinyl)ethyl]thio}acridine. | 2.5 kg. |
| 140 mg | Lactose, U.S.P | 1.4 kg. |
| 8 mg | Magnesium stearate, U.S.P | 80 gm. |
| 4 mg | Sodium lauryl sulfate, U.S.P | 40 gm. |

Blend above ingredients and fill into No. 1 hard gelatin capsules.

EXAMPLE 13

CAPSULES, 125 MG.

| Amt./capsule | Ingredient | Amt./10,000 capsules |
|---|---|---|
| 125 mg | 3,6-bis(dimethylamino)-9-{[2-(1-methyl-2-pryrolidinyl)ethyl]thio}acridine, sesquihydrate. | 1.25 kg. |
| 100 mg | Lactose, U.S.P | 1.0 kg. |
| 5 mg | Magnesium stearate, U.S.P | 50 gm. |
| 2 mg | Sodium lauryl sulfate, U.S.P | 20 gm. |

Blend above ingredients and fill into No. 3 hard gelatin capsules.

EXAMPLE 14

FILM COATED TABLET, 250 MG.

| Amt./tablet | Ingredient | Amt./10,000 tablets |
|---|---|---|
| 250 mg | 3,6-bis(dimethylamino)-9-{[2-(1-pyrrolidinyl)ethyl]thio}acridine. | 2.5 kg. |
| 125 mg | Microcrystalline cellulose | 1.25 kg. |
| 13 mg | Gelatin, U.S.P | 130 gm. |
|  | Water q.s. |  |
| 4 mg | Magnesium stearate, U.S.P | 40 gm. |
| 20 mg | Corn starch | 200 gm. |

Granulate the acridine and microcrystalline cellulose with the gelatin-water solution. Add other ingredients to the dry granulation. Compress using 13/32" standard concave tooling. Film coat using methyl cellulose (e.g., a commercially available grade known as Methocel 60 HG) dissolved in methanolmethylene chloride.

EXAMPLE 15

FILM COATED TABLET, 125 GM.

| Amt./tablet | Ingredient | Amt./10,000 tablets |
| --- | --- | --- |
| 125 mg | 3,6-Bis(dimethylamino)-9-[2-(piperidinoethyl)thio]acridine. | 1.25 kg. |
| 125 mg | Lactose, U.S.P | 1.25 kg. |
| 15 mg | Corn starch | 150 gm. |
| 12 mg | Gelatin, U.S.P | 120 gm. |
|  | Water q.s |  |
| 4 mg | Magnesium stearate | 40 gm. |

Blend the first three (3) ingredients and granulate with the gelatin-water solution. Add other ingredients to the dry granulation. Compress using 5/16" standard concave punches. Film coat using methyl cellulose dissolved in methanol-methylene chloride.

EXAMPLE 16

Suspension, 75 mg./5 cc.

| Ingredients: | Amt./100 cc. |
| --- | --- |
| 3,6 - bis(dimethylamino) - 9-{[2-(1-methyl-2-pyrrolidinyl) ethyl] thio}acriline, sesquihydrate _____gms__ | 1.5 |
| Emulsifying agent (e.g., Tween 60) _____cc__ | 0.1 |
| Sodium carboxymethylcellulose _____gm__ | 0.3 |
| Montmorillonite clay (Veegum H.V., R. T. Vanderbilt Co.) _____gm__ | 0.5 |
| Sugar _____gms__ | 10 |
| Glycerin _____cc__ | 2 |
| Sodium benzoate _____gm__ | 0.5 |
| Sodium citrate _____gm__ | 0.2 |
| Citric acid _____gm__ | 0.5 |
| Distilled water, q.s. ad., 100 cc. |  |

Hydrate the Veegum in a small quantity of distilled water. A solution of Tween 60 in 30 cc. of water is mixed with the acridine and then passed through a homogenizer. Add the sugar, glycerin, sodium citrate, sodium benzoate, citric acid, and sodium CMC, stirring until solution is effected. Add the hydrated Veegum to this solution and homogenize the resulting suspension. After adjusting pH to 5.0 with citric acid, the suspension is diluted with distilled water to 100 cc.

EXAMPLE 17

PARENTERAL SOLUTION, 100 MG./CC.

| Amount/100 ampoules | Ingredient | Amount/ ampoule |
| --- | --- | --- |
| 20 gm | 3,6-Bis(dimethylamino)-9-{[2-(1-methyl-2-pyrrolidinyl)ethyl]thio}acridine, sesquihydrate. | 200 mg. |
| 1.8 gm | Sodium chloride | 18 mg. |
| Q.s. ad pH 5.0 | Hydrochloric acid | Q.s. ad pH 5.0. |
| Q.s. ad 200 cc | Sterile distilled water | Q.s. ad 2 cc. |

Add sodium chloride to a solution of the acridine in sterile distilled water. After adjustment to pH 5.0 with hydrochloric acid, this solution is sterilized by filtereing through a millipore filter or 02 Selas candle. Aseptically fill 2.2 cc. of the sterile solution into each sterile 2 cc. ampoule. Draw seal and leak-test.

I claim:

1. A member of the class consisting of alkylaminothioacridine compounds having the formula

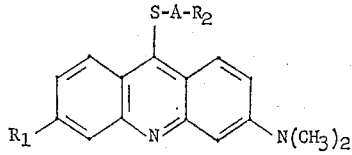

and pharmaceutically acceptable salts of the acridine compounds where $R_1$ is H or dimethylamino, $R_2$ is a cyclic nitrogen-containing group selected from the class consisting of pyrrolidinyl, 1-methylpyrrolidinyl, 1-ethylpyrrolidinyl, piperidino, piperidyl, 1-methylpiperidyl, hexahydro-1H-azepinyl, and 2-, 3-, and 4-pyridyl; and A is a divalent alkyl group having 1, 2, or 3 carbon atoms or a direct bond, A in either case attaching $R_2$ in a manner providing at least a two-carbon separation between the $R_2$-nitrogen and the attaching bond.

2. A pharmaceutically acceptable acid addition salt of an alkylaminothioacridine compound as defined in claim 1.

3. An alkylaminothioacridine according to claim 1 where A is ethylene and $R_2$ is hexahydro-1H-azepinyl which compound is 3,6-bis(dimethylamino)-9-{[2-hexahydro-1H-azepin-1-yl)ethyl]thio}acridine or a pharmaceutically acceptable salt.

4. An alkylaminothioacridine according to claim 1 where A is ethylene and $R_2$ is piperidino which compound is 3,6 - bis(dimethylamino)-9-[(2-piperidinoethyl) thio]acridine or a pharmaceutically acceptable salt.

5. An alkylaminothioacridine according to claim 1 where A is ethylene and $R_2$ is 1-methyl-2-pyrrolidinyl which compound is 3,6 - bis(dimethylamino)-9-{[2-(1-methyl-2-pyrrolidinyl)ethyl]thio}acridine or a pharmaceutically acceptable salt.

6. An alkylaminothioacridine according to claim 1 where A is ethylene and $R_2$ is pyrrolidinyl which compound is 3,6-bis(dimethylamino)-9-{[2-(1 - pyrrolidinyl) ethyl]thio}acridine or a pharmaceutically acceptable salt.

References Cited

UNITED STATES PATENTS

| 2,082,171 | 6/1937 | Mietsch | 260—279 |
| 3,072,485 | 1/1963 | Reynolds | 260—279 X |
| 3,232,945 | 2/1966 | Sigal | 260—279 |

OTHER REFERENCES

Albert, "The Acridines," Arnold, 1951, p. 221, relied upon.

Clinton et al., Jour. Am. Chem. Soc., vol. 10, pp. 591–4 (1948).

Elslager, Jour. Org. Chem., vol. 27, 4346–9 (1962).

DONALD G. DAUS, Examiner

U.S. Cl. X.R.

260—239 B, 247.1, 290 R, 293 R, 293.7 R, 294.8 G, 326.8, 326.82; 424—248, 257